US012407140B2

(12) United States Patent
Chen et al.

(10) Patent No.: US 12,407,140 B2
(45) **Date of Patent: *Sep. 2, 2025**

(54) CONNECTOR COMPONENT AND ELECTRONIC DEVICE

(71) Applicant: Huawei Digital Power Technologies Co., Ltd., Shenzhen (CN)

(72) Inventors: Jingxiao Chen, Shenzhen (CN); Peixing Chen, Dongguan (CN); Ruizhi Xue, Dongguan (CN); Wei Li, Dongguan (CN); Chenfei Quan, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 367 days.

This patent is subject to a terminal disclaimer.

(21) Appl. No.: 17/950,265

(22) Filed: Sep. 22, 2022

(65) Prior Publication Data

US 2023/0094141 A1 Mar. 30, 2023

(30) Foreign Application Priority Data

Sep. 29, 2021 (CN) .......................... 202111154348.2

(51) Int. Cl.
*H01R 13/71* (2006.01)

(52) U.S. Cl.
CPC .................................... *H01R 13/71* (2013.01)

(58) Field of Classification Search
CPC ........ H01R 13/71; H01R 13/26; H01R 13/53; H01R 13/187; H01R 13/639
USPC .................................................. 439/188, 483
See application file for complete search history.

(56) References Cited

U.S. PATENT DOCUMENTS

| | | | | | |
|---|---|---|---|---|---|
| 1,753,317 | A * | 4/1930 | Rothen | H01R 13/635 | 439/180 |
| 1,966,950 | A * | 7/1934 | Good | H01R 13/26 | 439/269.2 |
| 2,490,580 | A * | 12/1949 | Colla, Jr. | H01R 13/635 | 439/131 |
| 3,644,938 | A * | 2/1972 | Slate | H01R 13/633 | 439/349 |

(Continued)

FOREIGN PATENT DOCUMENTS

| | | | |
|---|---|---|---|
| CN | 1808775 | A | 7/2006 |
| CN | 200979979 | Y | 11/2007 |
| EP | 1521381 | B1 | 5/2006 |

*Primary Examiner* — Harshad C Patel
(74) *Attorney, Agent, or Firm* — Maier & Maier, PLLC

(57) ABSTRACT

A connector component and an electronic device, related to the field of connector technologies, to resolve a problem that the connector component does not support slow hot insertion or removal. The connector component includes a first connector and a second connector. The first connector includes a first conductive terminal. The second connector includes a second conductive terminal, a first sliding terminal and a first stopper that are fastened, and a second sliding terminal and a second stopper that are fastened. The second conductive terminal, the first sliding terminal, and the second sliding terminal are slidably connected in sequence. A first force accumulator is connected to the second conductive terminal and the first sliding terminal, and a second force accumulator is connected to the first sliding terminal and the second sliding terminal.

19 Claims, 18 Drawing Sheets

(56) References Cited

U.S. PATENT DOCUMENTS

| | | | | | |
|---|---|---|---|---|---|
| 3,678,442 | A * | 7/1972 | Cope | B61G 5/10 | 439/187 |
| 4,659,160 | A * | 4/1987 | Jonval | H01R 13/527 | 439/187 |
| 5,248,259 | A * | 9/1993 | Naito | H01R 13/71 | 439/700 |
| 6,089,887 | A * | 7/2000 | Ozaki | H01R 33/0809 | 200/51.09 |
| 6,416,338 | B1 * | 7/2002 | Berlovan | H01R 43/26 | 439/187 |
| 6,746,258 | B2 * | 6/2004 | Kikuchi | H01R 13/635 | 217/1 |
| 7,044,759 | B2 * | 5/2006 | Hughes | B60R 19/48 | 439/180 |
| 9,373,912 | B1 * | 6/2016 | Juds | H01R 13/6666 | |
| 2011/0111611 | A1 * | 5/2011 | Zamora Gomez | H01R 13/629 | 439/180 |
| 2022/0209463 | A1 * | 6/2022 | Chen | H01R 13/639 | |
| 2023/0097389 | A1 * | 3/2023 | Chen | H01R 13/14 | 439/843 |

* cited by examiner

CONNECTOR COMPONENT AND ELECTRONIC DEVICE

CROSS-REFERENCE TO RELATED APPLICATION

This application claims priority to Chinese Patent Application No. 202111154348.2, filed on Sep. 29, 2021, which is hereby incorporated by reference in its entirety.

TECHNICAL FIELD

The embodiments relate to the field of connector technologies, a connector component, and an electronic device that can support slow hot insertion or removal.

BACKGROUND

A connector component is widely applied to a plurality of different types of circuits, to implement conduction or disconnection of currents in the circuits. For example, the connector component may include a male connector and a female connector. After the male connector is inserted into the female connector, a circuit may be connected, so that a current can flow in the circuit. After the male connector is removed from the female connector, the circuit may be disconnected, so that the current is blocked in the circuit. In some scenarios, when a voltage in a circuit is high, an electric arc may be generated in a hot swapping (that is, insertion or removal with powered on) process of the male connector and the female connector. If the electric arc lasts for a long time, defects such as ablation may occur. Therefore, during operation, the male connector and the female connector need to be inserted or removed at a high speed (for example, more than 2 m/s), to reduce duration of the electric arc as much as possible. However, in an actual operation, the male connector or the female connector may not be quickly moved to implement quick insertion or removal. Therefore, a connector component, which can still reduce the duration of the electric arc when the male connector and the female connector are hot-inserted or removed at a low speed, is urgently needed at present.

SUMMARY

The embodiments may provide a connector component and an electronic device that can support slow hot insertion or removal.

In an aspect, the embodiments may provide a connector component, including a first connector and a second connector. The first connector includes a first housing and a first conductive terminal. The first conductive terminal is fastened to the first housing. The second connector includes a fastening component, a first movable component, and a second movable component. The fastening component includes a second conductive terminal. The first movable component includes a first sliding terminal and a first stopper. The first sliding terminal is slidably connected to the second conductive terminal, and the first stopper is fastened to the first sliding terminal. The second connector further includes a first force accumulator, and the first force accumulator is connected to the fastening component and the first movable component. In a process in which the first connector is connected to the second connector, when the first stopper is fastened relative to the first housing, the fastening component and the first movable component slide relative to each other, so that the first force accumulator is deformed due to an accumulated force; and when the first stopper is unfastened relative to the first housing, the first force accumulator is restored from the deformation, to drive a second sliding terminal to be connected to the first conductive terminal. The second movable component includes a second sliding terminal and a second stopper. The second sliding terminal is slidably connected to the second sliding terminal, and the second stopper is fastened to the second sliding terminal. The second connector further includes a second force accumulator, and the second force accumulator is connected to the first movable component and the second movable component.

Alternatively, in a process in which the first connector is separated from the second connector, when the second stopper is fastened relative to the first housing, the first movable component and the second movable component slide relative to each other, so that the second force accumulator is deformed due to an accumulated force; and when the second stopper is unfastened relative to the first housing, the second force accumulator is restored from the deformation, to drive the second sliding terminal to be separated from the first conductive terminal.

In the connector component, in the process in which the first connector is connected to the second connector, when the first stopper is fastened relative to the first housing, and relative deviation is generated between the fastening component and the first movable component due to an external force acting on the fastening component, the first force accumulator may be deformed due to the accumulated force. When the first stopper is unfastened relative to the first housing, the first force accumulator may be restored from the deformation, to drive the first movable component and the second movable component to move, so that the second sliding terminal may be connected to the first conductive terminal. In the process in which the first connector is separated from the second connector, when the second stopper is fastened relative to the first housing, the fastening component drives the first movable component due to the external force acting on the fastening component, and relative deviation is generated between the first movable component and the second movable component, the second force accumulator may be deformed due to the accumulated force. When the second stopper is unfastened relative to the first housing, the second force accumulator may be restored from the deformation, to drive the second movable component to move, so that the second sliding terminal may be separated from the first conductive terminal.

Alternatively, it may be understood that, when an external force (for example, a hand) acts on a second housing and the second connector moves toward a first direction to connect the first connector, after the first stopper is fastened relative to the first housing, the first movable component and the second movable component stop moving. When the second housing continues to move toward the first direction, the relative deviation is generated between the fastening component and the first movable component, so that the first force accumulator may be deformed due to the accumulated force. After the first stopper is unfastened relative to the first housing, the first movable component and the second movable component may move toward the first direction. In addition, under an acting force of restoring the first force accumulator from the deformation, the first force accumulator may drive the first movable component and the second movable component to quickly move toward the first direction, so that the second sliding terminal may be quickly connected to the first conductive terminal, to effectively reduce duration of an electric arc. Correspondingly, when the external force (for example, the hand) acts on the second housing and the second connector moves toward a second direction to separate from the first connector, after the second stopper is fastened relative to the first housing, the second movable component stops moving. In this case, the first conductive terminal is connected with the second sliding terminal. When the fastening component continues to move toward the second direction, the fastening component drives the first movable component to move, and the relative deviation is generated between the first movable component and the second movable component, so that the second force accumulator may be deformed due to the accumulated force. After the second stopper is unfastened relative to the first housing, the second movable component may move toward the second direction. In addition, under an acting force of restoring the second force accumulator from the deformation, the second force accumulator may drive the second movable component to quickly move toward the second direction, so that the second sliding terminal may be quickly separated from the first conductive terminal, to effectively reduce the duration of the electric arc.

In a process in which the second connector is connected to the second connector along the first direction and the fastening component moves to a position, the first stopper is fastened relative to the first housing; when the fastening component continues to move along the first direction, the first force accumulator is deformed due to the accumulated force, and the fastening component acts on the first stopper, so that the first stopper is unfastened relative to the first housing; and when the first force accumulator is restored from the deformation, the second sliding terminal is connected to the first conductive terminal.

Alternatively, it may be understood that, in this embodiment, when the first connector is connected to the second connector, accumulation and release of the first force accumulator may be implemented in the entire connection process. Therefore, the second sliding terminal may be quickly and reliably connected to the first conductive terminal. This does not depend on a movement speed of the hand in this process, which facilitates an actual operation.

In addition, in a process in which the second connector is separated from the second connector along the second direction, the second stopper is fastened relative to the first housing. When the fastening component drives the first movable component to continue to move along the second direction, and the second force accumulator is deformed due to the accumulated force, the first movable component acts on the second stopper, so that the second stopper is unfastened relative to the first housing. When the second force accumulator is restored from the deformation, the second sliding terminal is separated from the first conductive terminal.

Alternatively, it may be understood that, in this embodiment, when the first connector is separated from the second connector, the accumulation and release of the second force accumulator may be implemented in the entire separation process. Therefore, the second sliding terminal may be quickly and reliably separated from the first conductive terminal. This does not depend on the movement speed of the hand in this process, which facilitates the operation.

In an implementation, the second conductive terminal has a first sliding slot facing the first direction. One end of the first sliding terminal facing the second direction is slidably inserted into the first sliding slot, so that the second conductive terminal may be slidably connected to the first sliding terminal.

One end of the second sliding terminal may have a second sliding slot facing the second direction, and one end of the first sliding terminal facing the first direction is slidably inserted into the second sliding slot, so that the first sliding terminal is slidably connected to the second sliding terminal, and the first sliding terminal can slide relative to the second sliding terminal along the first direction or the second direction.

In some implementations, the second connector may further include a first base and a second housing. The first base is fastened to the second housing, and the second conductive terminal is fastened to the second housing. The second housing has a third sliding slot that is disposed in parallel to the first direction, the first base is slidably disposed in the third sliding slot, one end of the first force accumulator is connected to the first base, and the other end of the first force accumulator is connected to the second housing.

In some implementations, the second connector may further include a second base. The second base is fastened to the first base. The second base has a sliding cylinder that is disposed in parallel to the first direction, and the second sliding terminal is slidably disposed in the sliding cylinder. When the second sliding terminal slides along the first direction or the second direction, the second sliding terminal is slidably fitted with the sliding cylinder, improving stability of the second sliding terminal during sliding.

In addition, there may be various structural forms and disposing manners of the first stopper.

For example, the first stopper may include a first fastener and a first spring. The first fastener is rotationally connected to the first base, and the first spring is connected to the first fastener and the first base. The first housing has a first abutting surface facing the second direction; and the first spring is configured to rotate the first fastener to a position at which the first fastener abuts against the first abutting surface. Alternatively, the position may be understood as a first lock-up position. When the first movable component continues to move along the first direction and the first fastener is located in the first lock-up position, the first movable component may abut against the first abutting surface, to prevent the first stopper from moving toward the first direction. When the second housing continues to move along the first direction, the fastening component may slide relative to the first movable component, so that the first force accumulator may be deformed due to the accumulated force.

Under an action of the external force, the first fastener may further be rotated to a position at which the first fastener does not abut against the first abutting surface. Alternatively, the position may be understood as a first unlocking position. In a direction that is parallel to the first direction, a projection of the first fastener on the first housing does not intersect the first abutting surface. When the first fastener is rotated to the first unlocking position, because the first fastener is not affected by an abutting action of the first abutting surface, the first movable component and the second movable component may be driven, through an elastic force of the first force accumulator, to slide along the first direction, so that the second sliding terminal may be quickly connected to the first conductive terminal.

To enable the first fastener to change from the first lock-up position to the first unlocking position, a corresponding first trigger part may be disposed in the fastening component. For example, in an implementation, the second housing has a first trigger part. When the fastening component moves to a second connection position, the first trigger part acts on the first fastener until that the first fastener is rotated to the first unlocking position, so that the first fastener is unfastened relative to the first abutting surface.

In addition, in some implementations, there may be various structural forms and disposing manners of the second stopper.

For example, the second stopper may include a bracket, a second fastener, and a second spring. The second fastener is slidably connected to the bracket. The second spring is connected to the second fastener and the bracket and is configured to enable that the second fastener slides to a second lock-up position. The first housing has a second abutting surface facing the first direction. The second lock-up position is a position at which the second fastener abuts against the second abutting surface.

Under the action of the external force, the second fastener may further slide to a position at which the second fastener does not abut against the second abutting surface. Alternatively, the position may be understood as a second unlocking position. In the direction that is parallel to the first direction, a projection of the second fastener on the first housing does not intersect the second abutting surface. When the second fastener slides to the second unlocking position, because the second fastener is not affected by an abutting action of the second abutting surface, the second movable component may be driven, through an elastic force of the second force accumulator, to slide along the second direction, so that the second sliding terminal may be quickly separated from the first conductive terminal.

To enable the second fastener to change from the second lock-up position to the second unlocking position, a corresponding second trigger part may be disposed in the first movable component. For example, in an implementation, the first base has a second trigger part. When the fastening component acts on the first movable component and moves to a second separation position, the second trigger part acts on the second fastener until that the second fastener is rotated to the second unlocking position, so that the second fastener is unfastened relative to the second abutting surface.

In addition, in the process in which the first connector is separated from the second connector, to ensure that the first movable component can move along the second direction with the fastening component, in an implementation, the second housing has a first protrusion, and the first base has a second protrusion. When the second housing moves along the second direction, the first protrusion abuts against the second protrusion, so that the second housing drives the first base to move along the second direction.

In an implementation, the first housing may have various shapes.

For example, the first housing may have a first groove opened toward the second direction. One end of the first conductive terminal is located in the first groove, to well protect the first conductive terminal.

In addition, when the electric arc is generated when the first conductive terminal is connected to or separated from the sliding terminal, the electric arc may appear in the first groove. Therefore, to avoid ablation of the first housing, a ceramic layer or another high temperature resistance material may be disposed on a side wall of the first groove.

In addition, the first housing has a second groove opened toward the second direction; and after the first connector is connected to the second connector, one end of the first base facing the first direction may be inserted into the second groove, to tightly connect the first connector to the second connector. This improves waterproof and dust-proof performance.

In another aspect, the embodiments may further provide an electronic device. The electronic device includes a first power-consuming device, a second power-consuming device, and any of the connector components. A first connector is connected to the first power-consuming device, and a second connector is connected to the second power-consuming device. One end of a first conductive terminal may be electrically connected to a conductive structure of the first power-consuming device, and one end of a second conductive terminal may be electrically connected to a conductive structure of the second power-consuming device. When the first connector is connected to the second connector, the first power-consuming device may be connected to the second power-consuming device. When the first connector is separated from the second connector, the first power-consuming device may be disconnected from the second power-consuming device.

The first power-consuming device may be a solid-state transformer and the second power-consuming device may be a power module. Types of the first power-consuming device and the second power-consuming device and an application scenario of the connector component are not limited.

DETAILED DESCRIPTION OF THE EMBODIMENTS

To make objectives, solutions, and advantages clearer, the following further describes the embodiments in detail with reference to the accompanying drawings.

For ease of understanding of a connector component provided in the embodiments, the following first describes an application scenario of the connector component.

Figure 1:
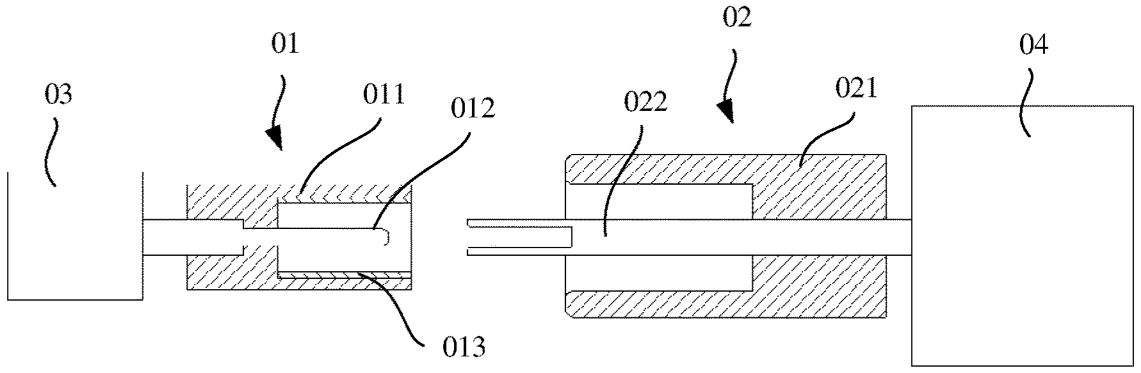
FIG. 1 is a schematic diagram of an application scenario of a connector component according to an embodiment.

FIG. 1 shows an application scenario of a connector component. The connector component may include a first connector 01 and a second connector 02. The first connector 01 includes an insulation housing 011 and a first conductive terminal 012. The first conductive terminal 012 is fastened to the insulation housing 011. The second connector 02 includes an insulation housing 021 and a second conductive terminal 022. The second conductive terminal 022 is fastened to the insulation housing 021. In an actual application, a left end of the first conductive terminal 012 may be electrically connected to an electronic device 03. Correspondingly, a right end of the second conductive terminal 022 may be electrically connected to an electronic device 04. When the first connector 01 is connected to the second connector 02, a right end of the first conductive terminal 012 is connected to a left end of the second conductive terminal 022, a circuit may be connected, to electrically connect the electronic device 03 to the electronic device 04. When the first connector 01 is separated from the second connector 02, the right end of the first conductive terminal 012 is separated from the left end of the second conductive terminal 022, so that the circuit may be disconnected, to disconnect a path between the electronic device 03 and the electronic device 04.

In some application scenarios, the connector component needs to have functions of hot insertion or removal. The hot insertion or removal means that when the first connector 01 is connected to or separated from the second connector 02, the first conductive terminal 012 or the second conductive terminal 022 is energized. When a voltage of the first conductive terminal 012 or the second conductive terminal 022 is high, an electric arc is inevitably generated when the first conductive terminal 012 is separated from or connected to the second conductive terminal 022. When a distance between the first conductive terminal 012 and the second conductive terminal 022 is within a range, the electric arc may be generated between the first conductive terminal 012 and the second conductive terminal 022. After the first conductive terminal 012 is connected to the second conductive terminal 022, or the distance between the first conductive terminal 012 and the second conductive terminal 022 is large enough, the electric arc may disappear. Burning of the electric arc may ablate the insulation housing or other parts around the connector component, or even cause undesirable situations such as explosion. Therefore, in some current connector components, a ceramic tube 013 or another high temperature resistant material may be disposed on an inner wall of the insulation housing 011 or a burning area of the electric arc. However, in an actual application, when duration of the electric arc lasts for a long time, undesirable situations such as ablation or electric arcing still occur. Currently, an effective solution is to reduce the duration of the electric arc as much as possible. However, the first connector 01 needs to be hot-inserted with or removed from the second connector 02 at a high moving speed (for example, more than 2 m/s). The first conductive terminal 012 may need to be quickly connected to the second conductive terminal 022, or the distance between the first conductive terminal 012 and the second conductive terminal 022 may need to be larger. In an actual operation, it may be difficult to manually move the first connector 01 or the second connector 02. Therefore, there are limitations. In addition, in some application scenarios, the first connector 01 and the second connector 02 are usually fastened to the electronic device. Therefore, when the first connector 01 needs to be connected to or separated from the second connector 02, the entire electronic device needs to be moved. As a result, it may be more difficult to implement quick movement.

Therefore, the embodiments provide the connector component that can support hot insertion or removal and can effectively reduce the duration of the electric arc in a hot insertion or removal process.

To make objectives, solutions, and advantages clearer, the following further describes the embodiments in detail with reference to the accompanying drawings.

The terms are used merely for the purpose of describing the embodiments but are not intended to limit. Terms "one", "a", and "this" of singular forms are also intended to include a form like "one or more", unless otherwise specified in the context clearly. It should be further understood that, in the following embodiments, "at least one" means one, two, or more.

Reference to "one embodiment" or the like means that one or more embodiments include a particular feature, structure, or characteristic described in combination with the embodiment. Therefore statements, such as "in an embodiment", "in some embodiments", and "in other embodiments", that appear at different places do not necessarily mean referring to a same embodiment, instead, the statements mean referring to "one or more but not all of the embodiments", unless otherwise specifically emphasized in other ways. Terms "include", "have", and variants of the terms all mean "include but are not limited to", unless otherwise specifically emphasized in other ways.

Figure 2:
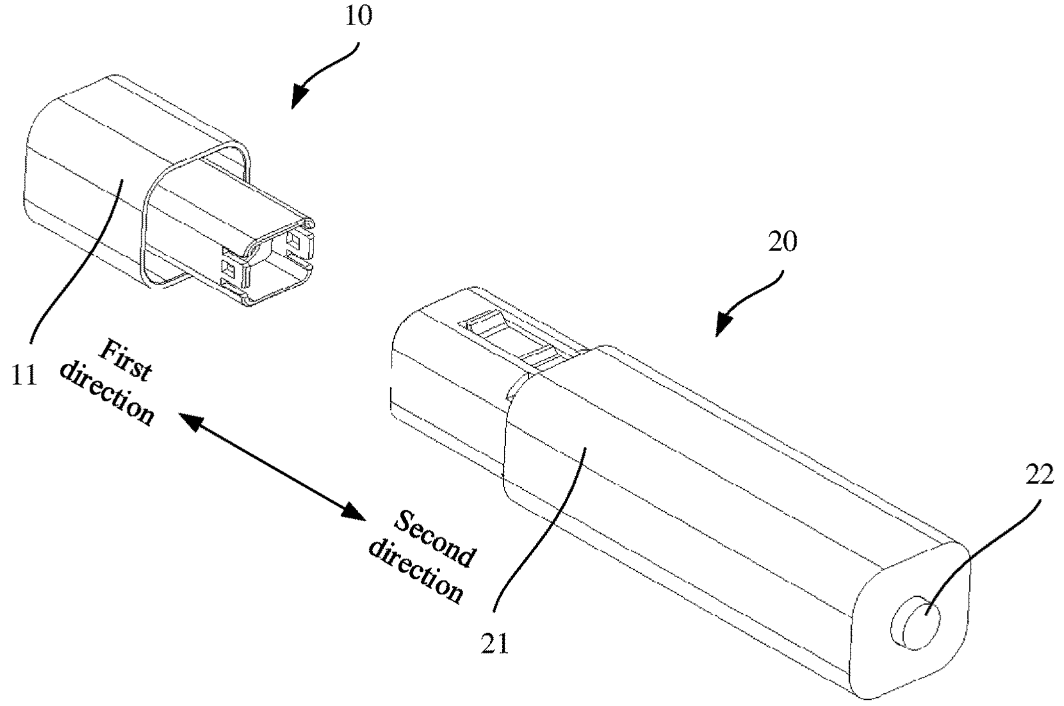
FIG. 2 is a schematic diagram of a three-dimensional structure of a connector component according to an embodiment.

As shown in FIG. 2, in an embodiment, the connector component includes a first connector 10 and a second connector 20. In addition, for ease of describing a movement status of each part when the first connector 10 is connected to and separated from the second connector 20, the following embodiments use an example in which the first connector 10 is fastened and the second connector 20 moves.

Figure 3:
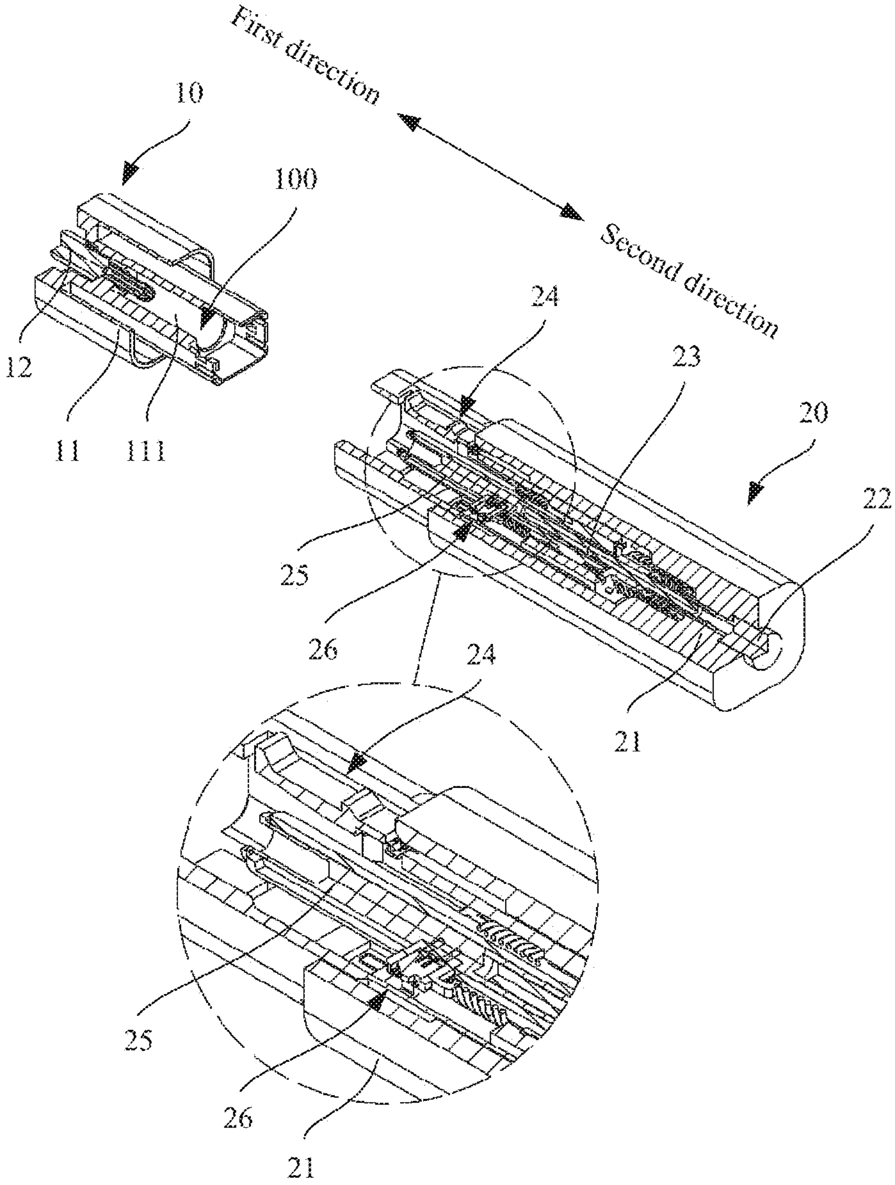
FIG. 3 is a schematic diagram of a cross-section structure of a connector component according to an embodiment.

Refer to FIG. 2 and FIG. 3. The first connector 10 includes a first housing 11 and a first conductive terminal 12. The first conductive terminal 12 is fastened to the first housing 11. The second connector 20 includes a fastening component (not shown in the figure) and a first movable component (not shown in the figure) and a second movable component (not shown in the figure). The fastening component includes a second housing 21 and a second conductive terminal 22. The second conductive terminal 22 is fastened to the second housing 21. The first movable component includes a first sliding terminal 23 and a first stopper 24. The first sliding terminal 23 is slidably connected to the second conductive terminal 22, and the first sliding terminal 23 is electrically connected to the second conductive terminal 22. The first stopper 24 is fastened to the first sliding terminal 23, and the two can synchronously move. The second movable component includes a second sliding terminal 25 and a second stopper 26. The second sliding terminal 25 is slidably connected to the first sliding terminal 23, and the first sliding terminal 23 is electrically connected to the second sliding terminal 25. The second stopper 26 is fastened to the second sliding terminal 25, and the two can synchronously move. In addition, the second connector 20 further includes a first force accumulator 27*a* and a second force accumulator 27*b*. The first force accumulator 27*a* is connected to the fastening component and the first movable component. When the fastening component and the first movable component move relative to each other under an external force, the first force accumulator 27*a* may be deformed due to the accumulated force when the fastening component and the first movable component extrude the first force accumulator 27*a*. When there is no constraint between the fastening component and the first movable component, the first force accumulator 27*a* is restored to a state before the first force accumulator is extruded, to drive the first movable component to move relative to the fastening component. That there is no constraint between the fastening component and the first movable component means that there is no limitation that the fastening component is fastened relative to the first movable component, and the fastening component and the first movable component may move relative to each other under an action of the external force. In addition, the second force accumulator 27*b* is connected to the first movable component and the second movable component. When the first movable component and the second movable component move relative to each other under the external force, the second force accumulator 27*b* may be deformed due to the accumulated force when the first movable component and the second movable component extrude the second force accumulator 27*b*. When there is no constraint between the first movable component and the second movable component, the second force accumulator 27*b* is restored to a state before the second force accumulator 27*b* is stretched, to drive the second movable component to move relative to the first movable component. That there is no constraint between the first movable component and the second movable component means that there is no limitation that the first movable component is fastened relative to the second movable component, and the first movable component and the second movable component may move relative to each other under the action of the external force.

In this embodiment, in a process in which the first connector 10 is connected to the second connector 20, when the first stopper 24 is fastened relative to the first housing 11, relative deviation is generated between the fastening component and the first movable component due to an external force acting on the fastening component, and the fastening component and the first movable component approach to each other face to face, the first force accumulator 27*a* may be deformed due to an accumulated force when the fastening component and the first movable component extrude the first force accumulator 27*a*. When the first stopper 24 is unfastened relative to the first housing 11, the first force accumulator 27*a* is restored to a state before the first force accumulator 27*a* is extruded, to drive the first movable component and the second movable component to move. Therefore, the second sliding terminal 25 may be connected to the first conductive terminal 12, to effectively reduce duration of an electric arc.

Alternatively, it may be understood that, when the external force (for example, a hand) acts on the second housing 21 and the second connector 20 moves toward a first direction relative to the first housing 11 to connect the first connector 10, after the first stopper 24 is fastened relative to the first housing 11, the first movable component and the second movable component stop moving. When the second housing 21 continues to move toward the first direction, the relative deviation is generated between the fastening component and the first movable component, so that the first force accumulator 27*a* may be deformed due to the accumulated force. After the first stopper 24 is unfastened relative to the first housing 11, the first movable component and the second movable component may move toward the first direction. In addition, under an acting force of restoring the first force accumulator 27*a* from the deformation, the first force accumulator 27*a* may drive the first movable component and the second movable component to quickly move toward the first direction, so that the second sliding terminal 25 may be quickly connected to the first conductive terminal 12, to effectively reduce the duration of the electric arc.

In addition, in a process in which the first connector 10 is separated from the second connector 20, when the second stopper 26 is fastened relative to the first housing 11, the external force acts on the fastening component, the fastening component drives the first movable component to move, relative deviation is generated between the first movable component and the second movable component, and the first movable component and the second movable component are separated from each other, the second force accumulator 27*b* may be deformed due to the accumulated force when the first movable component and the second movable component stretch the second force accumulator 27*b*. When the second stopper 26 is unfastened relative to the first housing 11, the second force accumulator 27*b* is restored to the state before the second force accumulator 27*b* is stretched, to drive the second movable component to move. Therefore, the second sliding terminal 25 may be separated from the first conductive terminal 12, to effectively reduce the duration of the electric arc.

Alternatively, it may be understood that, when the external force (for example, the hand) acts on the second housing 21 and the second connector 20 moves toward a second direction relative to the first housing 11 to separate from the first connector 10, after the second stopper 26 is fastened relative to the first housing 11, the second movable component stops moving. In this case, the first conductive terminal 12 is connected with the second sliding terminal 25. When the fastening component continues to move toward the second direction, the fastening component drives the first movable component to move, and the relative deviation is generated between the first movable component and the second movable component, so that the second force accumulator 27*b* may be deformed due to the accumulated force. After the second stopper 26 is unfastened relative to the first housing 11, the second movable component may move toward the second direction. In addition, under an acting force of restoring the second force accumulator 27*b* from the deformation, the second force accumulator 27*b* may drive the second movable component to quickly move toward the second direction, so that the second sliding terminal 25 may be quickly separated from the first conductive terminal 12, to effectively reduce the duration of the electric arc.

To facilitate understanding of the solutions, the following first separately describes structures of the first connector 10 and the second connector 20.

For the first connector 10, as shown in FIG. 3, in an embodiment, one end (a right end in the figure) of the first housing 11 has a first groove 100 opened toward the second direction. One end (a right end in the figure) of the first conductive terminal 12 is located in the first groove 100 and is configured to connect the second sliding terminal 25 of the second connector 20. The other end (a left end in the figure) of the first conductive terminal 12 protrudes out of one end (a left end in the figure) of the first housing 11 facing the first direction and is configured to connect a cable or a conductive structure of an electronic device.

A main function of the first housing 11 is to fasten and protect the first conductive terminal 12. The first housing 11 may be made of a material with good insulation, such as plastic. In a plane perpendicular to the second direction, an outline of the first housing 11 may be a rectangle, a circle, an ellipse, or another polygonal structure. A shape of the first housing 11 is not limited.

In addition, in a process in which the first conductive terminal 12 is connected to or separated from the sliding terminal 23, the electric arc may appear in the first groove 100. Therefore, in an embodiment, a ceramic layer 111 is disposed on a side wall of the first groove 100. The ceramic layer 111 has good insulation performance and high temperature resistance performance. Therefore, ablation of the first housing 11 caused by the electric arc can be effectively prevented, to improve safety of the first housing 11. It may be understood that in another implementation, another material having good insulation and high temperature resistance performance may be further disposed on an inner wall of the first groove 100. This is not limited.

As a carrier of a current, the first conductive terminal 12 may be made of a material with good conductivity, such as copper. A material of the first conductive terminal 12 is not limited. In addition, in this embodiment, the first conductive terminal 12 has a rod structure, and a length direction of the first conductive terminal 12 is parallel to the first direction. When the first conductive terminal 12 is connected to the sliding terminal 23, one end of the first conductive terminal 12 facing the second sliding terminal 25 may be inserted into a groove 251 of the second sliding terminal 25, to reliably connect the first conductive terminal 12 to the second sliding terminal 25.

It may be understood that, in another implementation, the end of the first conductive terminal 12 facing the second sliding terminal 25 may also be disposed as a groove structure, and the end of the second sliding terminal 25 facing the first conductive terminal 12 has a solid rod structure. This is not limited.

For the second connector 20, as shown in FIG. 3, in an embodiment, one end (for example, a left end in the figure) of the second housing 21 has a groove opened toward the first direction (not shown in the figure). In other words, an opening direction of a groove of the second connector 20 faces the first connector 10 in a process of connecting the first connector 10 to the second connector 20. One end (a left end in the figure) of the second conductive terminal 22 is located in the groove. The other end (a right end in the figure) of the second conductive terminal 22 protrudes out of one end (a right end in the figure) of the second housing 21 facing the second direction and is configured to connect the cable or the conductive structure of the electronic device.

A main function of the second housing 21 is to fasten and protect the second conductive terminal 22. The second housing 21 may be made of the material with good insulation, such as plastic. In the plane perpendicular to the second direction, an outline of the second housing 21 may be a rectangle, a circle, an ellipse, or another polygonal structure. A shape of the second housing 21 is not limited.

As carriers of currents, the second conductive terminal 22, the first sliding terminal 23, and the second sliding terminal 25 may be made of the material with good conductivity, such as copper. Materials of the second conductive terminal 22, the first sliding terminal 23, and the second sliding terminal 25 are not limited in the embodiments.

Figure 4:
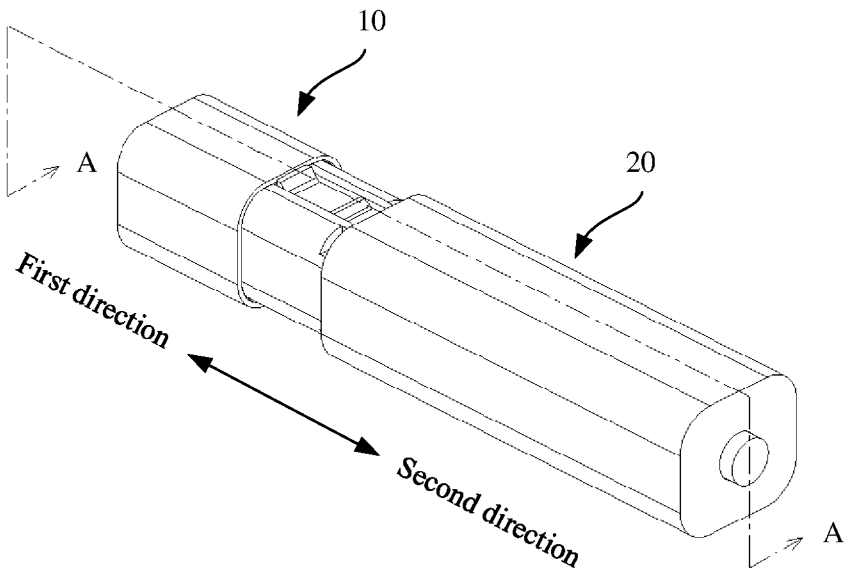
FIG. 4 is a schematic diagram of a cross-sectional structure of a connector component in a connection state according to an embodiment.
Figure 5:
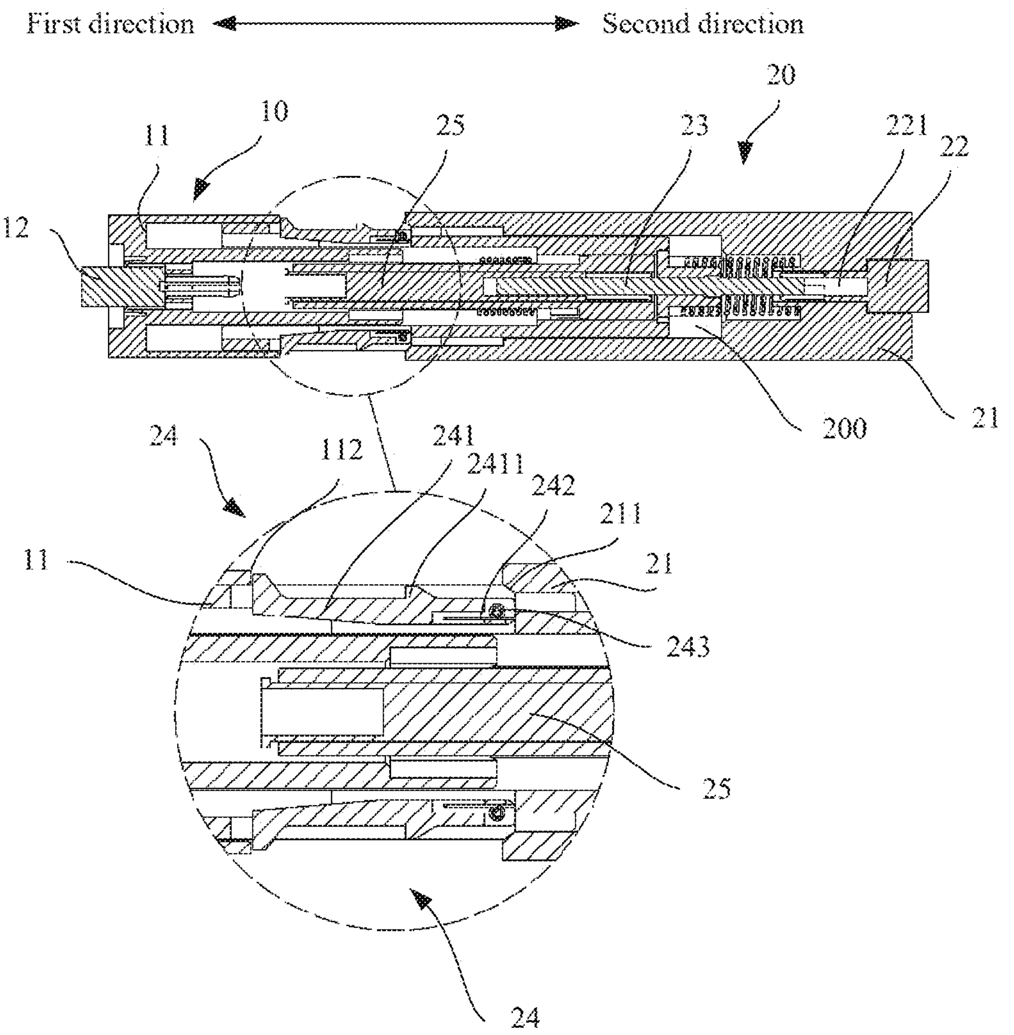
FIG. 5 is a schematic diagram of a cross-sectional structure of A-A in FIG. 4.

In addition, as shown in FIG. 4 and FIG. 5, in this embodiment, the second conductive terminal 22, the first sliding terminal 23, and the second sliding terminal 25 have a rod structure, and length directions of the second conductive terminal 22, the first sliding terminal 23, and the second sliding terminal 25 are parallel to the first direction.

To slidably connect the second conductive terminal 22 to the first sliding terminal 23, in this embodiment, the left end of the second conductive terminal 22 has a first sliding slot 221 (not shown in the figure) facing the first direction, and one end (a right end in the figure) of the first sliding terminal 23 facing the second direction is slidably inserted into the first sliding slot 221, to slidably connect the first sliding terminal 23 to the second conductive terminal 22.

To slidably connect the first sliding terminal 23 to the second sliding terminal 25, in this embodiment, a right end of the second sliding terminal 25 has a second sliding slot 252 (not shown in the figure) facing the second direction. One end (a left end in the figure) of the first sliding terminal 23 facing the first direction is slidably inserted into the second sliding slot 252, to slidably connect the first sliding terminal 23 to the second sliding terminal 25.

In addition, the second conductive terminal 22 may be electrically connected to the second sliding terminal 25 by using the first sliding terminal 23. The second conductive terminal 22 is electrically connected to the first sliding terminal 23, and the first sliding terminal 23 is electrically connected to the second sliding terminal 25. To reliably and electrically connect the second conductive terminal 22 and the first sliding terminal 23, in an actual application, a structure of a body of the first sliding slot 221 may be an elastic structure. For example, the body of the first sliding slot 221 may be provided with at least one gap along the first direction, so that when being squeezed by the first sliding terminal 23, the body of the first sliding slot 221 may be elastically deformed along a radial direction (or a direction perpendicular to the first direction). In addition, the body of the first sliding slot may be further elastically in contact with the first sliding terminal 23, to reliably and electrically connect the first sliding terminal 23 and the second conductive terminal 22. In another implementation, an electric-conductor may also be disposed on an inner wall of the first sliding slot 221, to elastically connect the first sliding terminal 23 to the second conductive terminal 22. This ensures reliability of electrical connection between the first sliding terminal 23 and the second conductive terminal 22 and does not affect the second conductive terminal 22 to slide relative to the first sliding terminal 23.

In addition, in some implementations, to ensure reliability of electrical connection between the first sliding terminal 23 and the second sliding terminal 25, a structure of a body of the second sliding slot 252 may be an elastic structure. For example, the body of the second sliding slot 252 may be provided with at least one gap along the first direction, so that when being squeezed by the first sliding terminal 23, the body of the second sliding slot 252 may be elastically deformed along the radial direction (or the direction perpendicular to the first direction). In addition, the body of the second sliding slot may be further elastically in contact with the first sliding terminal 23, to reliably and electrically connect the first sliding terminal 23 and the second sliding terminal 25. In another implementation, the electric-conductor may also be disposed on an inner wall of the second sliding slot 252, to elastically connect the first sliding terminal 23 to the second sliding terminal 25. This ensures the reliability of the electrical connection between the first sliding terminal 23 and the second sliding terminal 25 and does not affect the first sliding terminal 23 to slide relative to the second sliding terminal 25.

Figure 6:
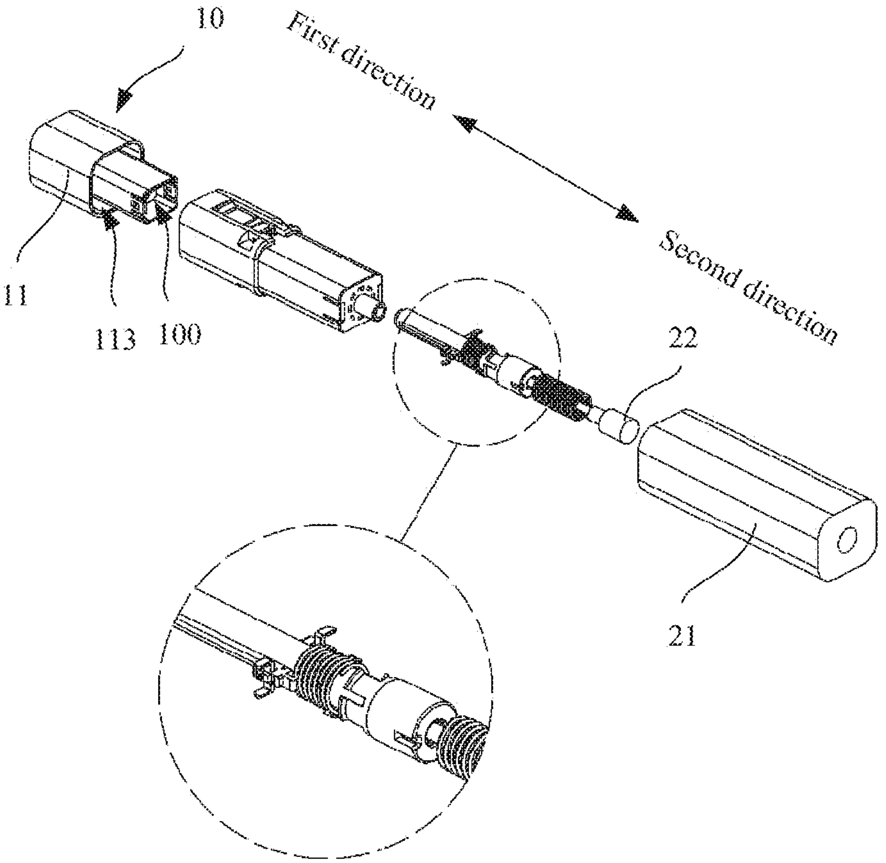
FIG. 6 is a schematic diagram of a breakdown structure of a connector component according to an embodiment.

In addition, as shown in FIG. 5 and FIG. 6, the first movable component may further include a first base 28*a*, and the first base 28*a* is fixedly connected to the first sliding terminal 23. The second housing 21 has a third sliding slot 200 that is disposed in parallel to the first direction, and the first base 28*a* is slidably disposed in the third sliding slot 200. The first base 28*a* may be made of the material with good insulation, such as plastic. When the first base 28*a* is slidably fitted with the third sliding slot 200, effectively ensuring stability of the first sliding terminal 23 during sliding relative to the second housing 21.

It may be understood that in an implementation, a material and a shape of the first base 28*a* may be properly set based on an actual requirement. This is not limited.

The first stopper 24 may have various structures.

For example, as shown in FIG. 5 and FIG. 6, in an embodiment, two first stoppers 24 are symmetrically disposed on an upper side and a lower side of the first sliding terminal 23. The two stoppers 24 have approximately the same structure. The following uses the first stopper 24 disposed on the upper side of the first sliding terminal 23 as an example. The first stopper 24 may include a first fastener 241 and a first spring 242. The first fastener 241 is rotationally connected to the first base 28*a*. The first spring 242 is connected to the first fastener 241 and the first base 28*a* and is configured to rotate the first fastener 241 to a first lock-up position shown in FIG. 3, so that the first fastener 241 may abut against a first abutting surface 112.

As shown in FIG. 3, the first fastener 241 is mounted on the first base 28*a* by using a rotating shaft 243, so that the first fastener 241 may rotate around the rotating shaft 243. The first spring 242 is connected to the first fastener 241 and the first base 28*a*. Under an elastic force of the first spring 242, the first fastener 241 may be maintained on the first lock-up position shown in FIG. 5. When the first fastener 241 is rotated in an anticlockwise direction under an acting force of another component, the first spring 242 is stressed and elastically deformed. After the acting force of the another component disappears, the first spring 242 is restored from the deformation, so that the first fastener 241 may be rotated along a clockwise direction to the first lock-up position.

As shown in FIG. 5, when the first fastener 241 is located in the first lock-up position, in a process in which the second connector 20 moves along the first direction, the first fastener 241 abuts against the first abutting surface 112 of the first housing 11, to prevent the first stopper 24 from moving leftward, and prevent the second sliding terminal 25 from approaching the first conductive terminal 12.

Figure 7:
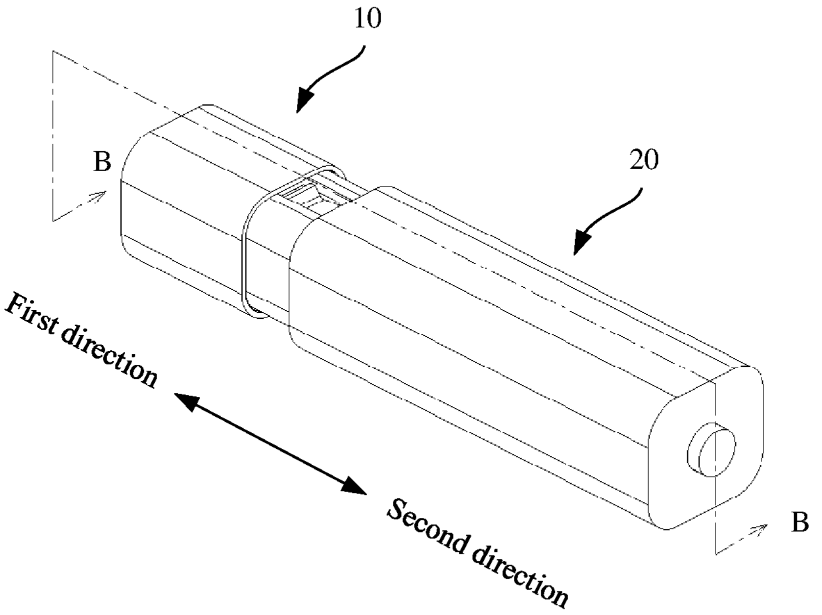
FIG. 7 is a schematic diagram of a cross-sectional structure of a connector component in a connection state according to an embodiment.
Figure 8:
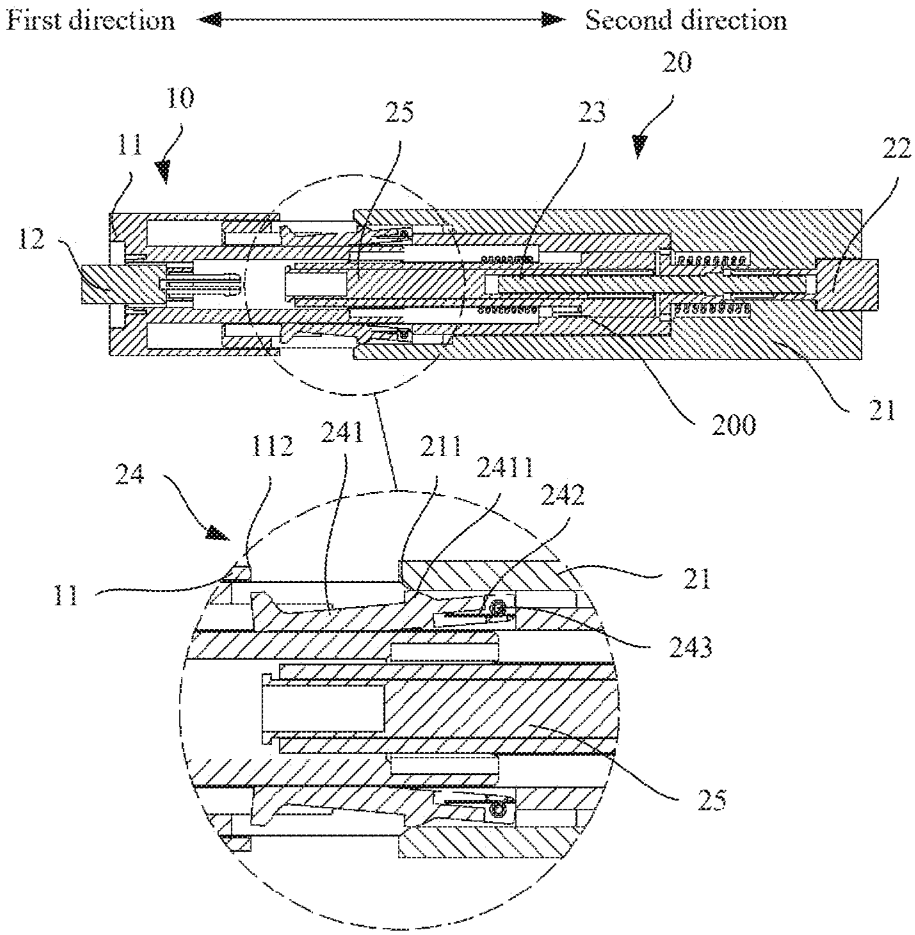
FIG. 8 is a schematic diagram of a cross-sectional structure of B-B in FIG. 7.

As shown in FIG. 7 and FIG. 8, when the first fastener 241 is located in a first unlocking position, the first fastener 241 does not abut against the first abutting surface 112 of the first housing 11. Alternatively, it may be understood that in a direction that is parallel to the first direction, a projection of the first fastener 241 on the first housing 11 does not intersect the first abutting surface 112, so that the first stopper 24 moves toward the first direction.

In this embodiment, to enable the first fastener 241 to rotate to the first unlocking position, the first fastener further has a first acting part 2411, and the second housing 21 further includes a first trigger part 211.

As shown in FIG. 8, the first acting part 2411 may be a protrusion on the first fastener 241 and the first trigger part 211 may be an oblique surface of the left end of the second housing 21. When the second housing 21 moves leftward, the first trigger part 211 abuts against the first acting part 2411, so that the first fastener 241 is rotated along the anticlockwise direction to the first unlocking position.

It may be understood that in another implementation, shapes and disposing positions of the first acting part 2411 and the first trigger part 211 may be properly set based on an actual requirement. This is not limited.

In addition, in this embodiment, the first movable component further includes a second base 28*b*, and the second base 28*b* is fastened to the first base 28*a*. The second base 28*b* may have a sliding cylinder (not shown in the figure) that is disposed in parallel to the first direction. The second sliding terminal 25 may be slidably disposed in the sliding cylinder. When the second sliding terminal 25 is slidably fitted with the second base 28*b*, it may effectively ensure stability of the second sliding terminal 25 during sliding.

In an actual application, a type and a disposing position of the first force accumulator 27*a* may be diversified.

For example, as shown in FIG. 8, in an embodiment, the first force accumulator 27*a* includes a spiral spring. The spiral spring is disposed on a periphery of the first sliding terminal 23, one end (a left end in the figure) is connected to the first base 28*a*, and the other end (a right end in the figure) is connected to the second housing 21. Under the action of the external force, when the second housing 21 moves relative to the first base 28*a* along the first direction, the first force accumulator 27*a* is compressed and deformed. When there is no other constraint between the first base 28*a* and the second housing 21, the first force accumulator 27*a* is restored from the deformation, so that the first base 28*a* slides relative to the second housing 21 along the first direction.

In this embodiment, the first force accumulator 27*a* may use a spiral spring with a good compression capability. When the first force accumulator 27*a* is compressed under the action of the external force, the external force may be effectively absorbed and converted into an elastic force of the first force accumulator 27*a*. Therefore, the first force accumulator 27*a* may be effectively restored to a state before the first force accumulator 27*a* is compressed, so that the elastic force can be effectively released to effectively push the first base 28*a* to move.

It may be understood that, in another implementation, the first force accumulator 27*a* may also be another elastic component that can absorb and release a force. In addition, the first force accumulator 27*a* may also be disposed at another position. In conclusion, under the action of the external force, when the second housing 21 moves relative to the first base 28*a* along the first direction, the first force accumulator 27*a* is deformed due to the accumulated force. When there is no constraint between the second housing 21 (or the fastening component) and the first base 28*a* (or the first movable component), the first force accumulator 27*a* can drive, through an elastic deformation of the first force accumulator 27*a*, the first base 28*a* to move along the first direction.

To facilitate understanding of the solutions, the following describes different states of the first connector 10 and the second connector 20 when the first connector 10 and the second connector 20 are connected.

As shown in FIG. 3, in this case, the first connector 10 and the second connector 20 are completely separated.

As shown in FIG. 5, the fastening component moves to a first connection position. Under the elastic force of the first spring 242, the first fastener 241 is located in the first lock-up position. The first force accumulator 27*a* may be in a natural state, the first force accumulator 27*a* is not extruded or stretched by the second housing 21 and the first base 28*a*. Under the action of the external force (for example, holding the second housing 21 by the hand), the second connector 20 gradually moves along the first direction until it is to be connected to the first connector 10, the first fastener 241 in the first lock-up position abuts against the first abutting surface 112 of the first housing 11, to prevent the first movable component from continuing to move along the first direction. It may be understood that the first movable component may include the first sliding terminal 23 and the first stopper 24.

As shown in FIG. 7 and FIG. 8, in this case, the fastening component moves to a second connection position.

As shown in FIG. 5, the second connector 20 continues to move along the first direction. Because the first fastener 241 is abutted by the first abutting surface 112, the first movable component and the second movable component do not continue to move along the first direction. Under the action of the external force (for example, holding the second housing 21 by the hand), the second housing 21 and the second conductive terminal 22 continue to move along the first direction. In this process, because the second housing 21 deviates relative to the first base 28*a* along the first direction, the first force accumulator 27*a* is extruded and elastically deformed.

As shown in FIG. 8, when the first trigger part 211 of the second housing acts on the first acting part 2411 of the first fastener 241, the first fastener 241 is rotated along the anticlockwise direction, so that the first fastener 241 is separated from the first abutting surface 112 of the first housing 11, to drive the first movable component to move along the first direction.

Figure 9:
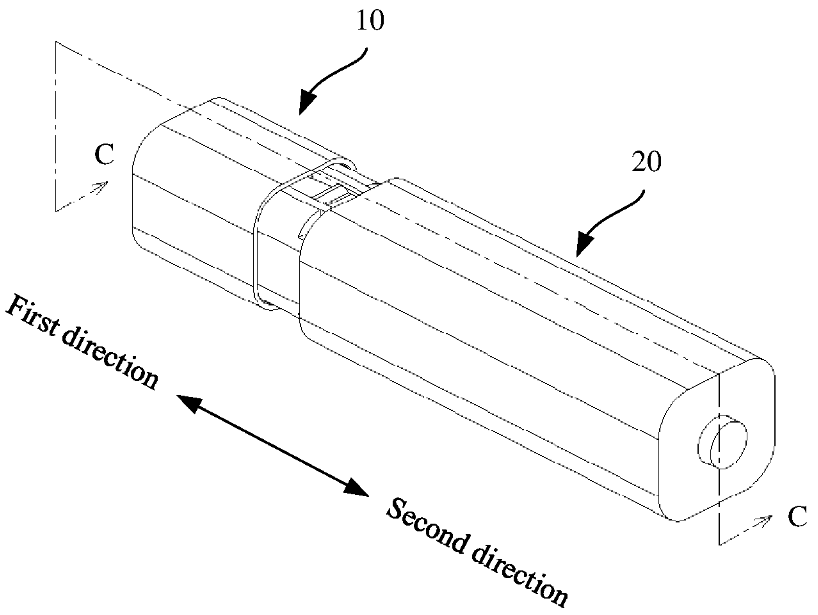
FIG. 9 is a schematic diagram of a cross-sectional structure of a connector component in a connection state according to an embodiment.
Figure 10:
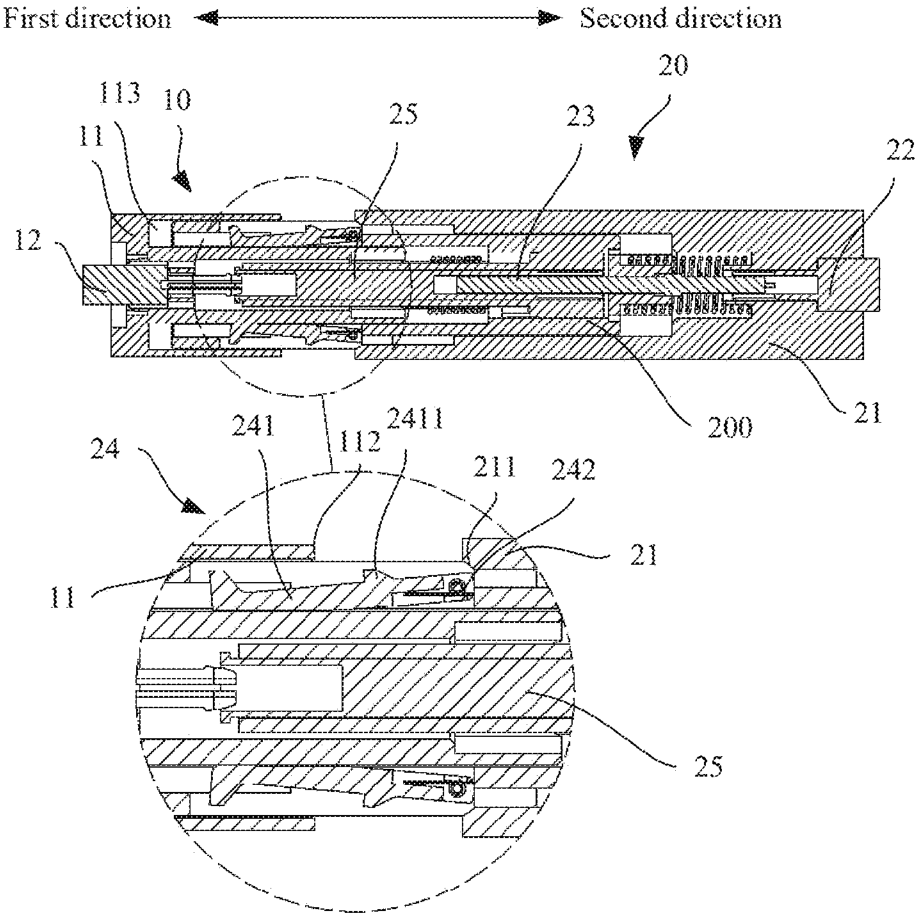
FIG. 10 is a schematic diagram of a cross-sectional structure of C-C in FIG. 9.
Figure 11:
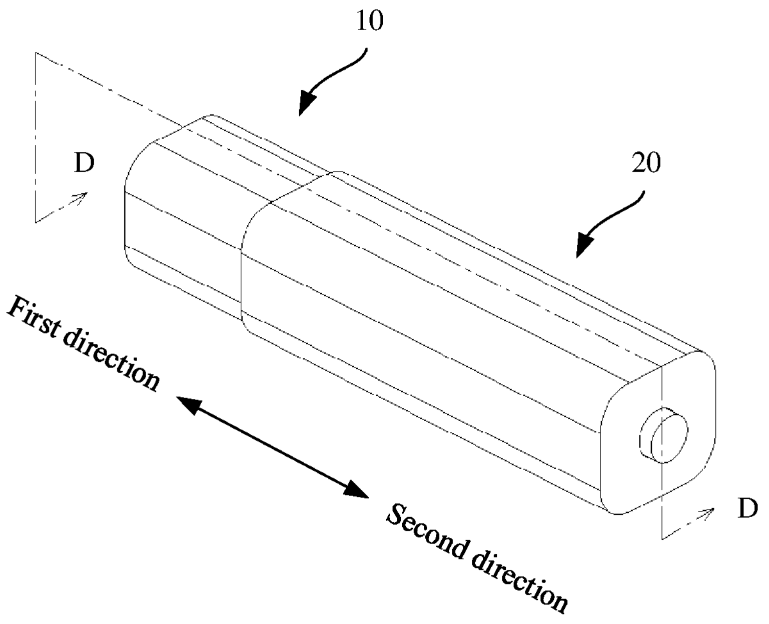
FIG. 11 is a schematic diagram of a cross-sectional structure of a connector component in a connection state according to an embodiment.

As shown in FIG. 9 and FIG. 10, in this case, the first force accumulator 27*a* (not shown in the figure) drives the first movable component and the second movable component to move to a third connection position.

As shown in FIG. 8 and FIG. 10, under the elastic force of the first force accumulator 27*a*, the first movable component quickly moves along the first direction. In addition, because a left end face of the first base 28*a* abuts against a right end face of the second base 28*b*, the first movable component (for example, the first base 28*a*) pushes the second movable component (for example, the second base 28*b*) to move along the first direction. Therefore, the second sliding terminal 25 may be quickly connected to the first conductive terminal 12, to reduce the duration of the electric arc as much as possible.

It may be understood that, when the first trigger part 211 starts to abut against the first acting part 2411 of the first fastener 241, a distance between the second sliding terminal 25 and the first conductive terminal 12 is long enough. Therefore, no electric arc is generated between the second sliding terminal 25 and the first conductive terminal 12. Under an acting force of the first force accumulator 27*a*, in a process in which the second sliding terminal 25 quickly moves along the first direction, when the second sliding terminal 25 is close enough to the first conductive terminal 12 and is not in contact with the first conductive terminal 12, the electric arc is inevitably generated. After the second sliding terminal 25 is connected to the first conductive terminal 12, the electric arc disappears.

Figure 12:
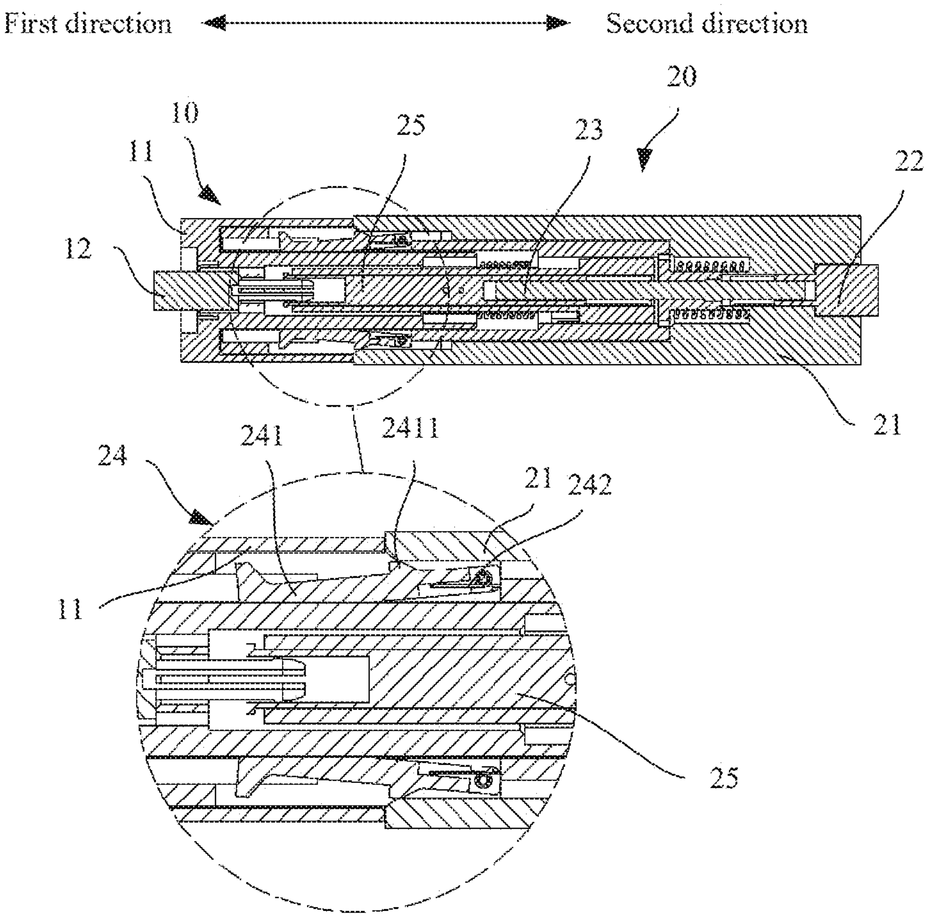
FIG. 12 is a schematic diagram of a cross-sectional structure of D-D in FIG. 11.

In addition, as shown in FIG. 10 and FIG. 12, in some implementations, to implement a better connection between the first conductive terminal 12 and the second sliding terminal 25, after the second sliding terminal 25 is connected to the first conductive terminal 12 under an action of the first force accumulator 27*a*, the second housing 21 may be further held by the hand to continue to move along the first direction, to ensure that a length of the first conductive terminal 12 that is inserted into the groove 251 is long enough. In addition, one end of the first base 28*a* facing the first direction may be inserted into a second groove 113 of the second housing 21. This tightly connects the first connector 10 to the second connector 20 and improves waterproof and dust-proof performance.

In addition, in this embodiment, when the first connector 10 is removed from the second connector 20, the second sliding terminal 25 may also be quickly separated from the first conductive terminal 12.

Figure 13:
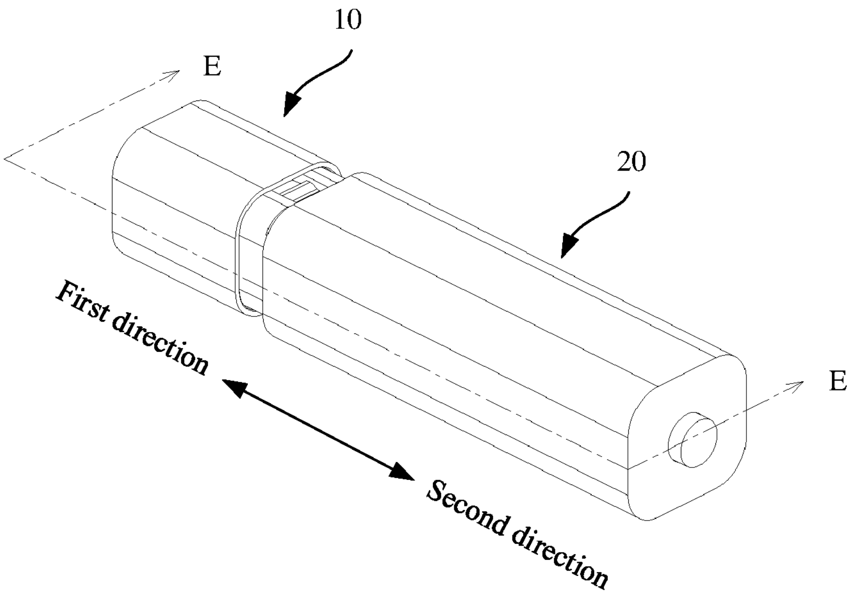
FIG. 13 is a schematic diagram of a cross-sectional structure of a connector component in a separation state according to an embodiment.
Figure 14:
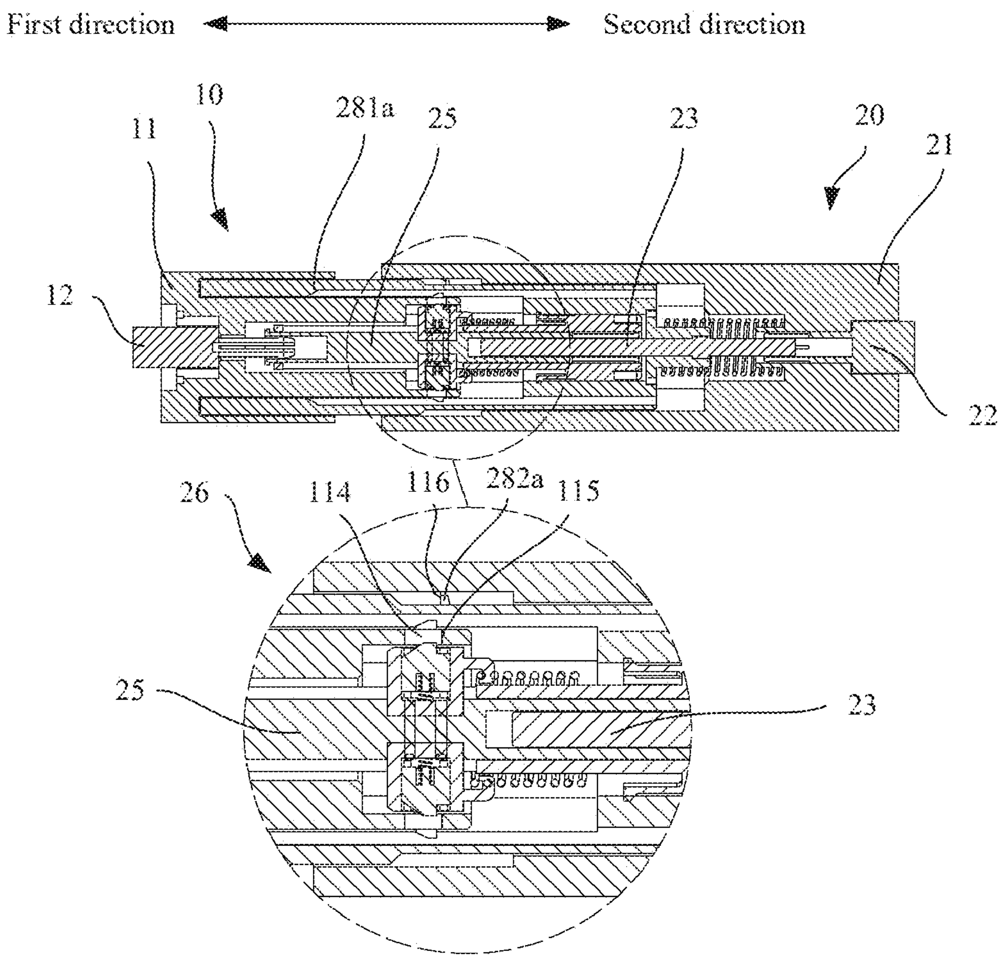
FIG. 14 is a schematic diagram of a cross-sectional structure of E-E in FIG. 13.

As shown in FIG. 13 and FIG. 14, the second stopper 26 may further include a bracket 261, a second fastener 262, and a second spring 263. The bracket 261 is fastened to the second sliding terminal 25, and the second fastener 262 is slidably connected to the bracket 261. The bracket 261 may have a sliding hole (not shown in the figure), the second fastener 262 may be disposed in the sliding hole, and may slide up and down along the sliding hole. The second spring 263 is located in the sliding hole, one end (an upper end in the figure) of the second spring 263 is connected to the second fastener 262, and the other end (a lower end in the figure) of the second spring 263 is connected to the bracket 261. In a natural state, the second spring 263 is configured to maintain the second fastener 262 in a second lock-up position shown in the figure.

Figure 17:
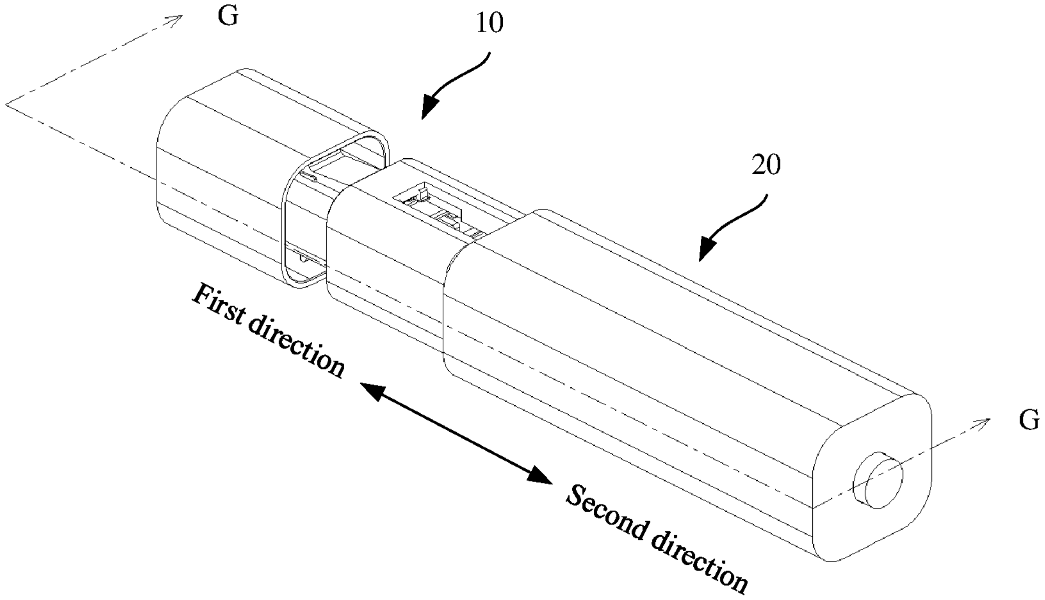
FIG. 17 is a schematic diagram of a cross-sectional structure of a connector component in a connection state according to an embodiment.
Figure 18:
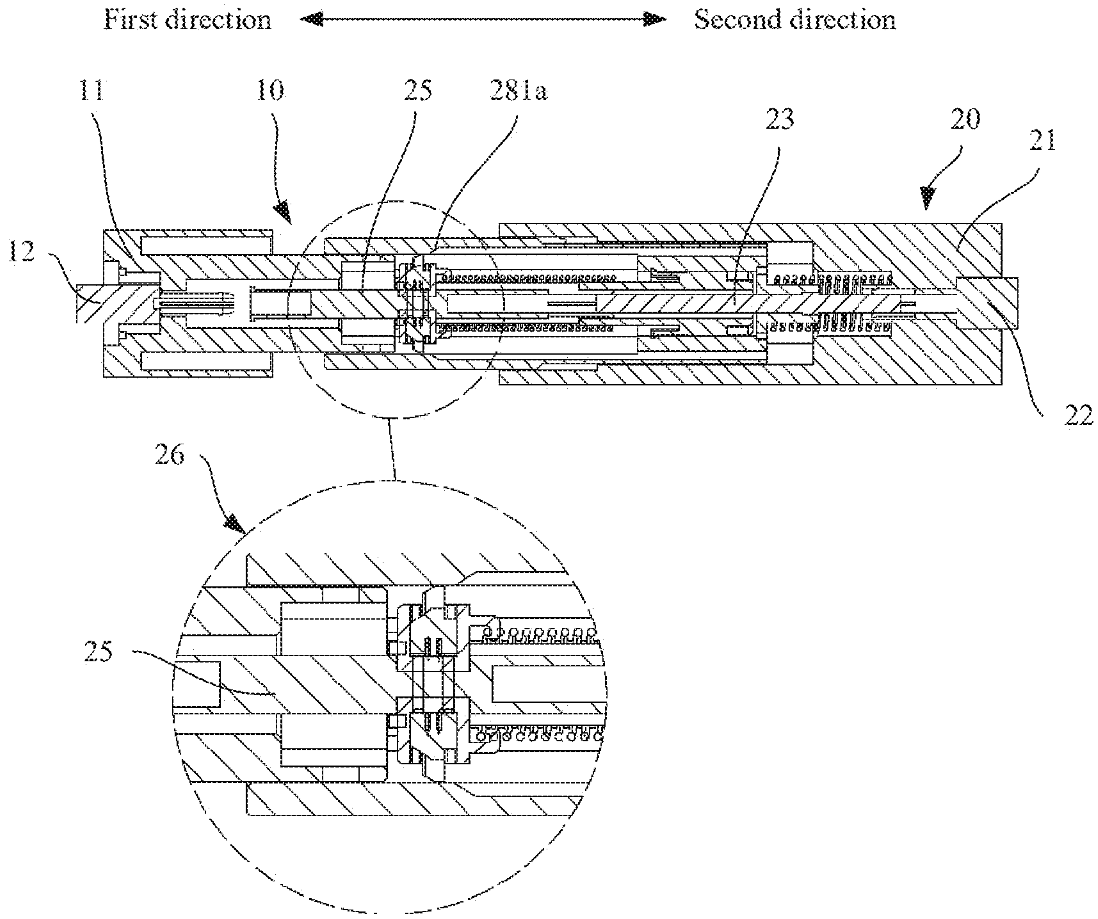
FIG. 18 is a schematic diagram of a cross-sectional structure of G-G in FIG. 17.

As shown in FIG. 17 and FIG. 18, in this case, under an action of a second trigger part 281*a*, the second fastener 262 slides down to a second unlocking position shown in FIG. 18. In this case, the second spring 263 is compressed. After a downward acting force applied to the second fastener 262 disappears, the second spring 263 may be restored from the deformation, so that the second fastener 262 slides up to the second lock-up position shown in FIG. 14.

As shown in FIG. 6 and FIG. 14, the second fastener 262 has a triple structure, and a protrusion 264 located in the middle is clamped with a card slot 114 of the first housing 11, to lock the first housing 11 with the second stopper 26. Two protrusions 265 and 266 located on two sides abut against the second trigger part 281*a* of the first base 28*a*. The second trigger part 281*a* is an oblique structure. When the second trigger part 281*a* abuts against the two protrusions 265 and 266, the second fastener 262 may be driven to move downward, so that the protrusion 264 is detached from the card slot 114, and the second fastener 262 is unfastened relative to the card slot 114.

It may be understood that, in another implementation, the second fastener 262 may also have another structure. For example, the second fastener 262 may also be disposed as a rotational structure similar to that of the first fastener 241. Correspondingly, the first fastener 241 may also be disposed as a sliding structure similar to the second fastener 262. This is not limited.

As shown in FIG. 14, in this embodiment, the second force accumulator 27*b* is a spiral spring. One end of the second force accumulator 27*b* is connected to the second base 28*b*, and the other end is connected to the bracket 261. Under the action of the external force, when the second base 28*b* moves relative to the bracket 261 along the second direction, the second force accumulator 27*b* is stretched and deformed. When there is no other constraint between the second base 28*b* and the bracket 261, the second force accumulator 27*b* is restored from the deformation, so that the bracket 261 slides relative to the second base 28*b* along the second direction.

In this embodiment, the second force accumulator 27*b* uses a spiral spring with a good tensile capability. When the second force accumulator 27*b* is stretched under the action of the external force, the external force may be effectively absorbed and converted into an elastic force of the second force accumulator 27*b*. Therefore, the second force accumulator 27*b* may be effectively restored to a status before the second force accumulator 27*b* is stretched, so that the elastic force can be effectively released to effectively pull the bracket 261 (or the second stopper 26) to move.

It may be understood that, in another implementation, the second force accumulator 27*b* may also be another elastic component that can absorb and release a force. In addition, the second force accumulator 27*b* may also be disposed at another position. In conclusion, under the action of the external force, when the second base 28*b* moves relative to the bracket 261 along the second direction, the second force accumulator 27*b* is deformed due to the accumulated force. When there is no constraint between the second base 28*b* (or the first movable component) and the bracket 261 (or the second movable component), the second force accumulator 27*b* can drive, through an elastic deformation of the second force accumulator 27*b*, the second sliding terminal 25 to move along the second direction.

To facilitate understanding of the solutions, the following describes different statuses of the first connector 10 and the second connector 20 when the first connector 10 and the second connector 20 are removed.

As shown in FIG. 13 and FIG. 14, in this case, the fastening component acts on the second movable component and moves to a first separation position. Under an elastic force of the second spring 263, the second fastener 262 is located at the second lock-up position shown in FIG. 15, and abuts against a second abutting surface 115 of the card slot 114, to prevent the second fastener 262 (or the second sliding terminal 25) from moving toward the second direction, the second stopper 26 is fastened relative to the first housing 11. In addition, the second force accumulator 27*b* is slightly stretched. When the hand acts on the second housing 21 and the second housing 21 moves rightward, a first protrusion 116 in the second housing 21 abuts against a second protrusion 282*a* in the first base 28*a*, so that the second housing 21 drives the first base 28*a* to move along the second direction. Because the first base 28*a* is fastened to the second base 28*b*, the second base 28*b* moves rightward with the second housing 21. When the second base 28*b* moves, the second base 28*b* stretches the second force accumulator 27*b* rightward, and the second force accumulator 27*b* stretches the bracket 261 (or the second movable component) rightward. After the second base 28*b* moves for a distance, the second fastener 262 abuts against the second abutting surface 115, to prevent the second fastener 262 (or the second sliding terminal 25) from moving toward the second direction.

Figure 15:
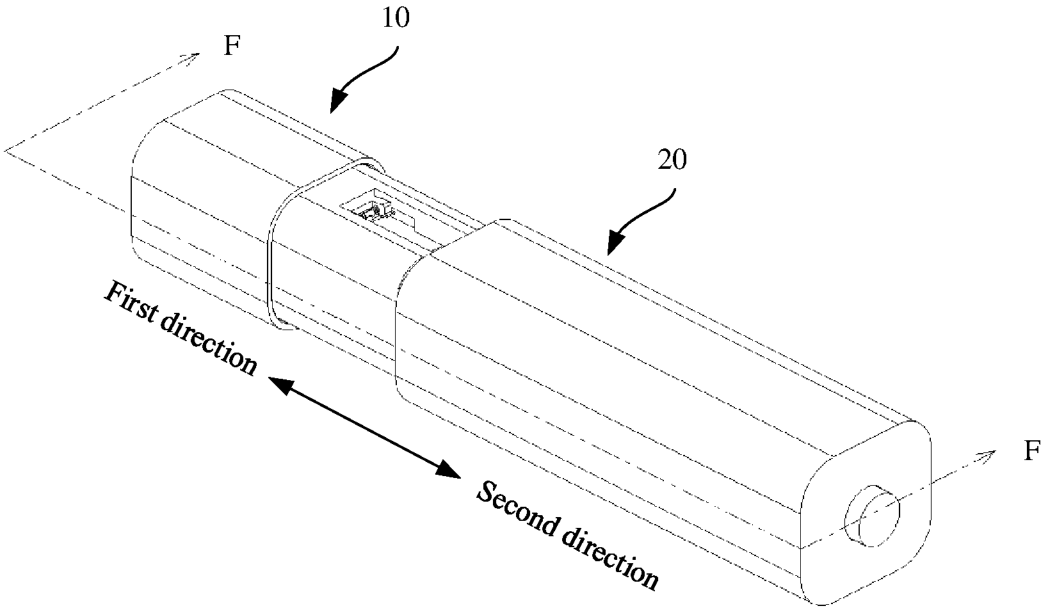
FIG. 15 is a schematic diagram of a cross-sectional structure of a connector component in a connection state according to an embodiment.
Figure 16:
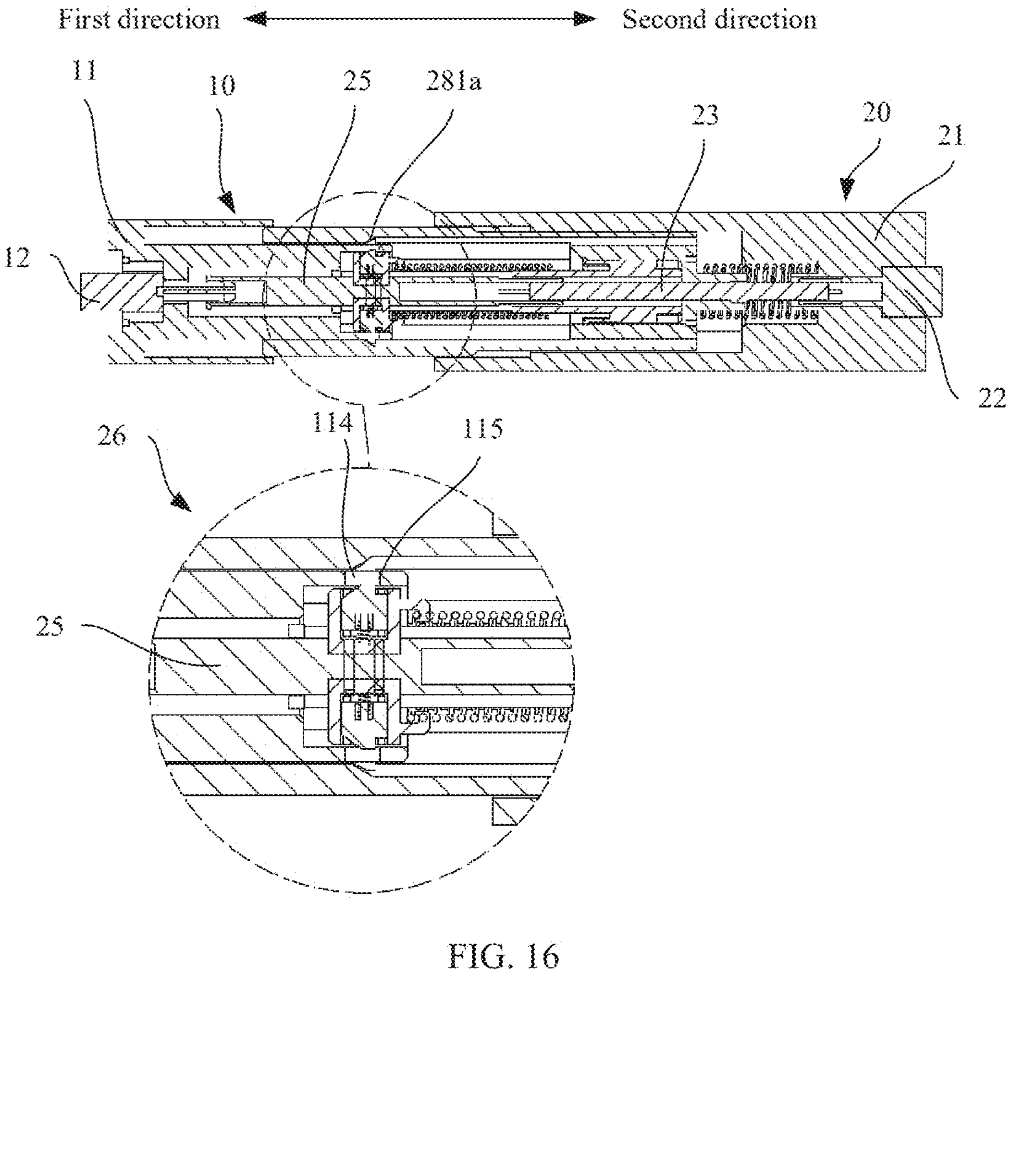
FIG. 16 is a schematic diagram of a cross-sectional structure of F-F in FIG. 15.

As shown in FIG. 15 and FIG. 16, in this case, the fastening component acts on the first movable component and moves to a second separation position, the second force accumulator 27*b* is deformed due to the accumulated force, and the second trigger part 281*a* of the first base 28*a* acts on the second fastener 262, so that the second fastener 262 slides down, and the second abutting surface 115 releases a limit on the second fastener 262. In addition, in this case, the second sliding terminal 25 is connected with the first conductive terminal 12.

As shown in FIG. 17 and FIG. 18, in this case, the second force accumulator 27*b* drives the second movable component to move to a third separation position. Under the elastic force of the second force accumulator 27*b*, the second movable component quickly moves along the second direction, so that the second sliding terminal 25 is separated from the first conductive terminal 12 at a high speed, to reduce a burning duration of the electric arc as much as possible.

In some implementations, to better separate the first connector 10 from the second connector 20, after the second sliding terminal 25 is separated from the first conductive terminal 12 under an action of the second force accumulator 27*b*, the second housing 21 may be further held by the hand to continue to move along the second direction.

In an application, the connector component may be applied to different types of circuits.

Figure 19:
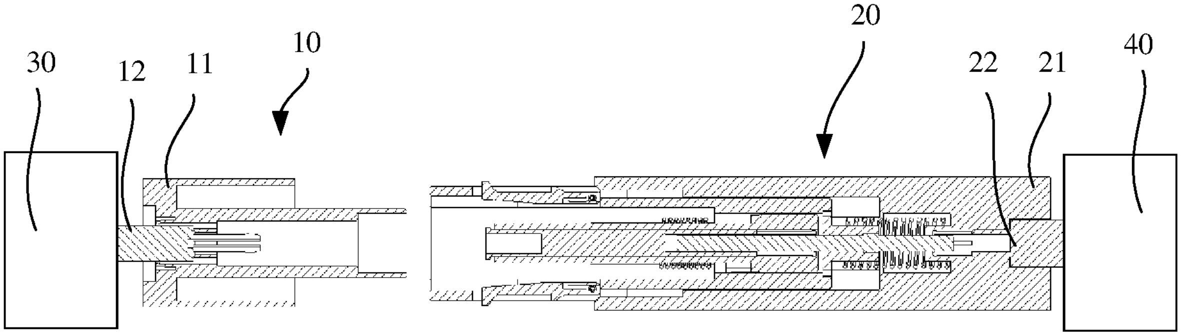
FIG. 19 is a schematic diagram of a structure of an electronic device according to an embodiment.

For example, as shown in FIG. 19, an embodiment may further provide an electronic device, including a first power-consuming device 30, a second power-consuming device 40, and any of the connector components. The first connector 10 is connected to the first power-consuming device 30, and the second connector 20 is connected to the second power-consuming device 40. One end (the left end in the figure) of the first conductive terminal 12 is electrically connected to a conductive structure of the first power-consuming device 30, and the other end (the right end in the figure) of the second conductive terminal 22 is electrically connected to a conductive structure of the second power-consuming device 40. When the first connector 10 is connected to the second connector 20, the first power-consuming device 30 may be connected to the second power-consuming device 40. When the first connector 10 is separated from the second connector 20, the first power-consuming device 30 may be disconnected from the second power-consuming device 40.

In an application, the first power-consuming device 30 may be a solid-state transformer, and the second power-consuming device 40 may be a power module. Types of the first power-consuming device 30 and the second power-consuming device 40 and an application scenario of the connector component are not limited.

The foregoing descriptions are merely implementations, but are not intended as limiting. Any variation or replacement readily figured out by a person skilled in the art shall fall within the scope of the embodiments.

What is claimed is:

1. A connector component, comprising a first connector comprising a first housing and a first conductive terminal, and the first conductive terminal is fastened to the first housing; and a second connector, wherein the second connector comprises:

a fastening component comprising a second conductive terminal, a first movable component comprising a first sliding terminal slidably connected to the second conductive terminal and a first stopper fastened to the first sliding terminal, and a second movable component comprising a second sliding terminal slidably connected to the first sliding terminal and a second stopper fastened to the second sliding terminal, a first force accumulator connected to the fastening component and the first movable component, and a second force accumulator connected to the first movable component and the second movable component; and in a process in which the first connector is connected to the second connector, when the first stopper is fastened relative to the first housing, the fastening component and the first movable component slide relative to each other, so that the first force accumulator is deformed due to an accumulated force; and when the first stopper is unfastened relative to the first housing, the first force accumulator is restored from the deformation, to drive the second sliding terminal to be connected to the first conductive terminal; or in a process in which the first connector is separated from the second connector, when the second stopper is fastened relative to the first housing, the first movable component and the second movable component slide relative to each other, so that the second force accumulator is deformed due to an accumulated force; and when the second stopper is unfastened relative to the first housing, the second force accumulator is restored from the deformation, to drive the second sliding terminal to be separated from the first conductive terminal.

2. The connector component according to claim 1, wherein in a process in which the second connector is connected to the second connector along a first direction, the first stopper is fastened relative to the first housing; when the fastening component continues to move along the first direction, the first force accumulator is deformed due to the accumulated force, and the fastening component acts on the first stopper, so that the first stopper is unfastened relative to the first housing; and when the first force accumulator is restored from the deformation, the sliding terminal is connected to the first conductive terminal.

3. The connector component according to claim 1, wherein a process in which the second connector is separated from the second connector along a second direction, the second stopper is fastened relative to the first housing; when the fastening component acts on the first movable component and continues to move along the second direction, the second force accumulator is deformed due to the accumulated force, and the first movable component acts on the second stopper, so that the second stopper is unfastened relative to the first housing; and when the second force accumulator is restored from the deformation, the second sliding terminal is separated from the first conductive terminal; and the second direction is opposite to the first direction.

4. The connector component according to claim 3, wherein the second conductive terminal has a first sliding slot facing the first direction; and one end of the first sliding terminal facing the second direction is slidably inserted into the first sliding slot.

5. The connector component according to claim 3, wherein the second sliding terminal has a second sliding slot facing the second direction; and one end of the first sliding terminal facing the first direction is slidably inserted into the second sliding slot.

6. The connector component according to claim 4, wherein the second sliding terminal has a second sliding slot facing the second direction; and one end of the first sliding terminal facing the first direction is slidably inserted into the second sliding slot.

7. The connector component according to claim 2, wherein the first movable component further comprises:

a first base fastened to the first sliding terminal, and a second housing fastened to the second conductive terminal and having a third sliding slot that is disposed in parallel to the first direction, wherein the first base is slidably disposed in the third sliding slot, one end of the first force accumulator is connected to the first base, and the other end of the first force accumulator is connected to the second housing.

8. The connector component according to claim 3, wherein the first movable component further comprises:

a first base fastened to the first sliding terminal, and a second housing fastened to the second conductive terminal and having a third sliding slot that is disposed in parallel to the first direction, wherein the first base is slidably disposed in the third sliding slot, one end of the first force accumulator is connected to the first base, and the other end of the first force accumulator is connected to the second housing.

9. The connector component according to claim 4, wherein the first movable component further comprises:

a first base fastened to the first sliding terminal, and a second housing fastened to the second conductive terminal and having a third sliding slot that is disposed in parallel to the first direction, wherein the first base is slidably disposed in the third sliding slot, one end of the first force accumulator is connected to the first base, and the other end of the first force accumulator is connected to the second housing.

10. The connector component according to claim 7, wherein the first movable component further comprises:

a second base fastened to the first base and having a sliding cylinder that is disposed in parallel to the first direction, wherein the second sliding terminal is slidably disposed in the sliding cylinder.

11. The connector component according to claim 10, wherein the first stopper further comprises:

a first fastener rotationally connected to the first base, and a first spring connected to the first fastener and the first base, wherein the first housing has a first abutting surface facing the second direction and the first spring is configured to rotate the first fastener to a position at which the first fastener abuts against the first abutting surface.

12. The connector component according to claim 11, wherein the second housing has a first trigger part; and when the first trigger part acts on the first fastener, the first trigger part is configured to rotate the first fastener to a position at which the first fastener does not abut against the first abutting surface.

13. The connector component according to claim 7, wherein the second stopper further comprises:

a bracket fastened to the second sliding terminal, a second fastener slidably connected to the bracket, and a second spring connected to the second fastener and the bracket, wherein the first housing has a second abutting surface facing the first direction and the second spring is configured to drive the second fastener to slide to a position at which the second fastener abuts against the second abutting surface.

14. The connector component according to claim 13, wherein the first base has a second trigger part; and when the second trigger part acts on the second fastener, the second trigger part is configured to drive the second fastener to a position at which the second fastener does not abut against the second abutting surface.

15. The connector component according to claim 14, wherein the second housing has a first protrusion, the first base has a second protrusion, and, when the second housing moves along the second direction, the first protrusion abuts against the second protrusion, so that the second housing drives the first base to move along the second direction.

16. The connector component according to claim 3, wherein the first housing has a first groove opened toward the second direction and one end of the first conductive terminal is located in the first groove.

17. The connector component according to claim 16, wherein a ceramic layer is disposed on a side wall of the first groove.

18. The connector component according to claim 7, wherein the first housing has a second groove opened toward the second direction; and after the first connector is connected to the second connector, and one end of the first base facing the first direction is inserted into the second groove.

19. An electronic device, comprising:

a first power-consuming device;

a second power-consuming device;

a connector component, which further comprises:

a first connector, wherein the first connector comprises a first housing and a first conductive terminal fastened to the first housing and electrically connected to the first power-consuming device, and a second connector, comprising:

a fastening component comprising a second conductive terminal electrically connected to the second power-consuming device, a first movable component comprising a first sliding terminal slidably connected to the second conductive terminal and a first stopper fastened to the first sliding terminal, and a second movable component comprising a second sliding terminal slidably connected to the first sliding terminal and a second stopper fastened to the second sliding terminal, a first force accumulator connected to the fastening component and the first movable component, and a second force accumulator connected to the first movable component and the second movable component; and in a process in which the first connector is connected to the second connector, when the first stopper is fastened relative to the first housing, the fastening component and the first movable component slide relative to each other, so that the first force accumulator is deformed due to an accumulated force; and when the first stopper is unfastened relative to the first housing, the first force accumulator is restored from the deformation, to drive the second sliding terminal to be connected to the first conductive terminal; or in a process in which the first connector is separated from the second connector, when the second stopper is fastened relative to the first housing, the first movable component and the second movable component slide relative to each other, so that the second force accumulator is deformed due to an accumulated force; and when the second stopper is unfastened relative to the first housing, the second force accumulator is restored from the deformation, to drive the second sliding terminal to be separated from the first conductive terminal.

* * * * *